(12) United States Patent
Park et al.

(10) Patent No.: US 9,255,789 B2
(45) Date of Patent: Feb. 9, 2016

(54) METHOD FOR MEASURING THICKNESS OF OBJECT

(71) Applicant: Samsung Electronics Co., Ltd., Suwon-Si, Gyeonggi-Do (KR)

(72) Inventors: Jang-Ik Park, Suwon-si (KR); Il-Hwan Nam, Hwaseong-si (KR); Kwan-Woo Ryu, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/286,213

(22) Filed: May 23, 2014

(65) Prior Publication Data

US 2015/0029517 A1    Jan. 29, 2015

(30) Foreign Application Priority Data

Jul. 25, 2013  (KR) .......................... 10-2013-0088094

(51) Int. Cl.
  *G01B 11/28*  (2006.01)
  *G01B 11/06*  (2006.01)
(52) U.S. Cl.
  CPC .................................. *G01B 11/0633* (2013.01)
(58) Field of Classification Search
  CPC ............... G01N 21/211; G01N 2021/1725; G01N 21/1702; G01N 2021/213; G01N 21/8422; G01N 21/21; G01N 27/223; G01N 2021/1748; G01N 2021/4126; G01N 2021/9513; G01N 21/274; G01N 21/6428; G01N 21/9501
  See application file for complete search history.

(56) References Cited

U.S. PATENT DOCUMENTS

| | | | | |
|---|---|---|---|---|
| 6,153,444 | A  * | 11/2000 | Nakano et al. | ................... 438/16 |
| 6,545,763 | B1 * | 4/2003 | Kim et al. | ..................... 356/503 |
| 6,956,660 | B2 | 10/2005 | Meeks et al. | |
| 7,167,241 | B1 | 1/2007 | Johs et al. | |
| 2007/0139656 | A1* | 6/2007 | Wan | .......................... 356/504 |
| 2013/0006539 | A1 | 1/2013 | Di et al. | |
| 2013/0033698 | A1* | 2/2013 | Fujimori | ......................... 356/51 |

FOREIGN PATENT DOCUMENTS

| | | |
|---|---|---|
| JP | 2007040930 A | 2/2007 |
| JP | 2012154931 A | 8/2012 |
| KR | 100627187 B1 | 9/2006 |
| KR | 100644390 B1 | 11/2006 |
| KR | 20090132538 A | 12/2009 |

* cited by examiner

*Primary Examiner* — Michael P Stafira
(74) *Attorney, Agent, or Firm* — Harness, Dickey & Pierce, P.L.C.

(57) ABSTRACT

Methods for measuring a thickness of an object including acquiring at least one of a wavelength domain spectrum for an amplitude ratio ($\Psi$) and a phase difference ($\Delta$) of reflected light from a film material, converting the wavelength domain spectrum into a 1/wavelength domain spectrum, acquiring a resulting spectrum by performing fast fourier transform (FFT) on the 1/wavelength domain spectrum, and measuring a thickness of the film material from the resulting spectrum may be provided.

20 Claims, 11 Drawing Sheets

$$\beta = 2\pi \left(\frac{d_1}{\lambda}\right) n_1 \cos\theta_1$$

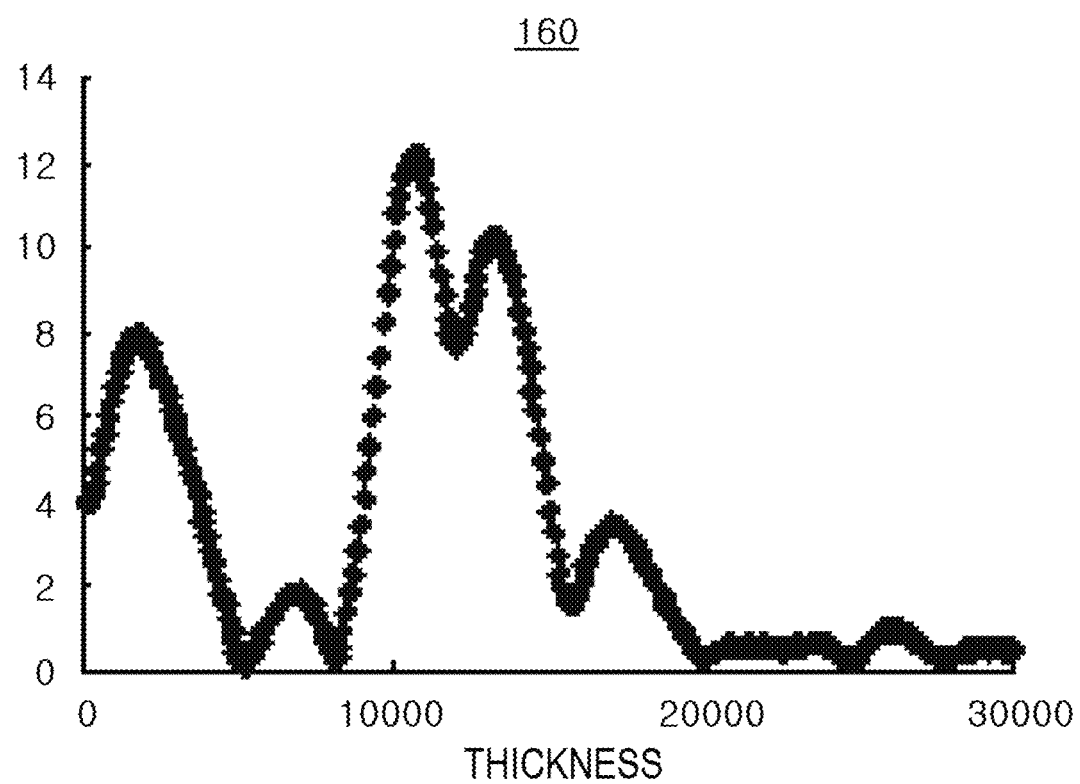

METHOD FOR MEASURING THICKNESS OF OBJECT

CROSS-REFERENCE TO RELATED APPLICATION

This application claims priority to Korean Patent Application No. 10-2013-0088094 filed on Jul. 25, 2013 in the Korean Intellectual Property Office, and all the benefits accruing therefrom under 35 U.S.C. 119, the contents of which in its entirety are herein incorporated by reference.

BACKGROUND

1. Field

The present inventive concepts relate to a method for measuring a thickness of an object.

2. Description of the Related Art

In order to determine whether a semiconductor process has been successfully performed or not, physical dimensions (e.g., a thickness) of a film material or a thin film are measured during or after performing the semiconductor process. The quality and/or manufacturability of the semiconductor process can be improved by feeding back the test results (e.g., a measured thickness of a film material or a thin film) of the semiconductor substrate to the semiconductor process. To this end, non-contact, non-destructive apparatuses for measuring a thickness of an object using X-ray, sonic wave or light are being used because such apparatuses do not process, destruct, or convert an object to be measured (e.g., a semiconductor substrate).

Researches for thickness measurement techniques are being conducted to meet the requirement for being more accurate, being capable of measuring more complicated patterns.

SUMMARY

The present inventive concepts provide methods for measuring a thickness of a film using spectrums demonstrating optical properties of reflected light.

The present inventive concepts also provide methods for measuring a thickness of a pattern formed on a substrate using spectrums demonstrating optical properties of reflected light.

Some example embodiments of the present inventive concepts will be described in or be apparent from the following description of the example embodiments.

According to an example embodiment of the present inventive concepts, a method for measuring a thickness of an object may include acquiring a wavelength domain spectrum for at least one of an amplitude ratio ($\Psi$) and a phase difference ($\Delta$) of reflected light from a film material, converting the wavelength domain spectrum into a 1/wavelength domain spectrum, acquiring a resulting spectrum by performing fast fourier transform (FFT) on the 1/wavelength domain spectrum, and measuring a thickness of the film material from the resulting spectrum.

According to an example embodiment of the present inventive concepts, a method for determining a defectiveness of a substrate may include acquiring a wavelength domain spectrum for at least one of an amplitude ratio ($\Psi$) and a phase difference ($\Delta$) of reflected light from a substrate having a pattern formed thereon, converting the wavelength domain spectrum into a 1/wavelength domain spectrum, acquiring a resulting spectrum by performing fast fourier transform (FFT) on the 1/wavelength domain spectrum, and measuring a thickness of the pattern formed on the substrate from the resulting spectrum.

According to an example embodiment of the present inventive concepts, a method for determining a defectiveness of a substrate may include irradiating light onto a remaining object on the substrate, detecting light reflected from the object, acquiring a wavelength domain spectrum based on one of an amplitude ratio ($\Psi$) and a phase difference ($\Delta$) of the detected reflected light, converting the wavelength domain spectrum into a 1/wavelength domain spectrum, acquiring a resulting spectrum by performing fast fourier transform (FFT) on the 1/wavelength domain spectrum, and determining a thickness of the pattern from the resulting spectrum.

BRIEF DESCRIPTION OF THE DRAWINGS

The above and other features and advantages of the present inventive concepts will become more apparent by describing in detail example embodiments thereof with reference to the attached drawings in which:

FIG. 14 is an enlarged view of the calibrated spectrum shown in FIG. 7.

DETAILED DESCRIPTION OF EXAMPLE EMBODIMENTS

The present inventive concepts will now be described more fully hereinafter with reference to the accompanying drawings, in which example embodiments of the inventive concepts are shown. This inventive concepts may, however, be embodied in different forms and should not be construed as limited to the example embodiments set forth herein. Rather, these example embodiments are provided so that this disclosure will be thorough and complete, and will fully convey the scope of the inventive concepts to those skilled in the art. Like reference numbers indicate like components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the inventive concepts (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concepts.

Figure 1:
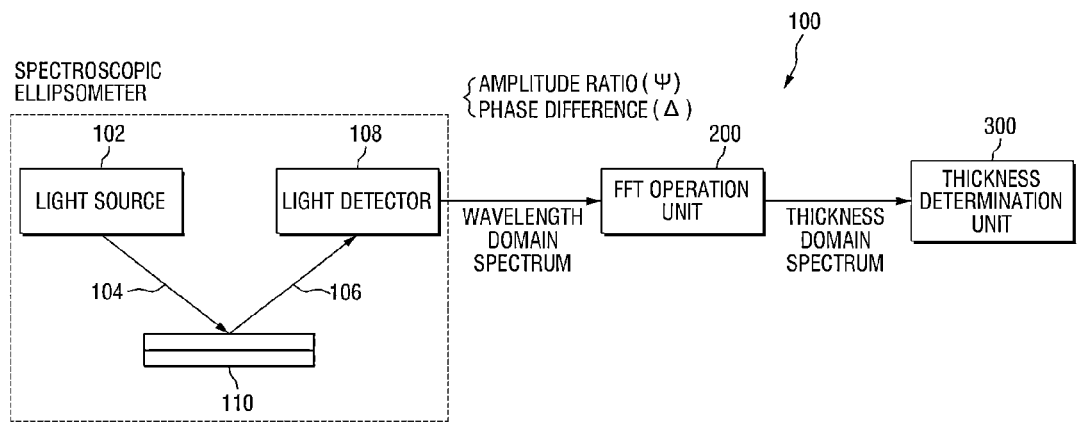
FIG. 1 is a schematic diagram of an optical thickness measurement apparatus according to an example embodiment of the present inventive concepts.
Figure 2:
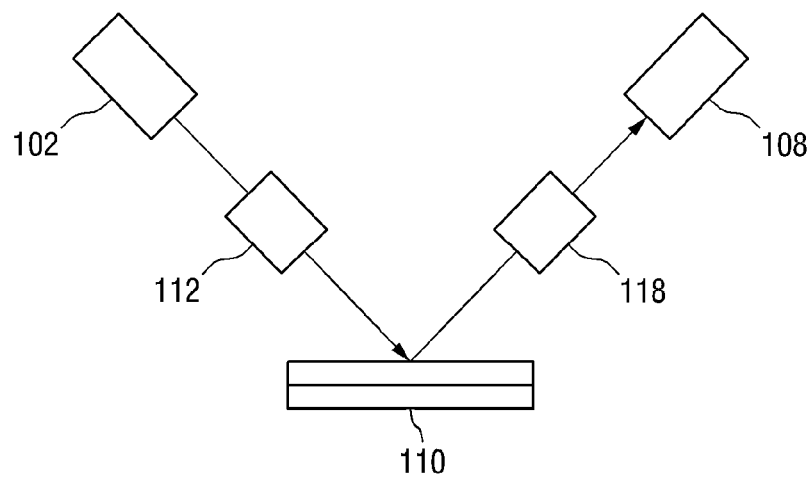
FIG. 2 is a detailed diagram of the optical thickness measurement apparatus shown in FIG. 1.

Hereinafter, an optical thickness measurement apparatus according to some example embodiments of the present inventive concepts will now be described with reference to FIGS. 1 and 2. FIG. 1 is a schematic diagram of an optical thickness measurement apparatus according to an example embodiment of the present inventive concepts and FIG. 2 is a detailed diagram of the optical thickness measurement apparatus 100 shown in FIG. 1.

First, an object 110 to be measured (hereinafter, "object") according to an example embodiment of the present inventive concepts may be, for example, a film material, a thin film, or a substrate. In some example embodiments of the present inventive concepts, the thin film may include two or more layers. In some example embodiments of the present inventive concepts, the thin film may include two or more materials. The substrate according to some embodiments of the present inventive concepts may include, for example, a relatively thick substrate, for example, a silicon (Si) substrate, a glass substrate, a sapphire substrate, a stacked substrate (e.g., a silicon on insulator (SOI) substrate). Further, the substrate according to some example embodiments of the present inventive concepts may have various patterns formed thereon.

Referring to FIG. 1, the optical thickness measurement apparatus 100 according to an example embodiment of the present inventive concepts may include a light source 102, a light detector 108, a fast fourier transformation (FFT) unit 200, and a thickness determination unit 300. The optical thickness measurement apparatus 100 may provide data of wavelength distribution characteristics (e.g., an amplitude ratio ($\Psi$) or a phase difference ($\Delta$)) of reflected light 106 from the object 110. The thickness of the object 110 may be calculated by processing the data by a FFT operation unit (e.g., a specific processor configured to perform FFT) 200 and a thickness determination unit (e.g., a specific processor configured to determine a thickness of an object) 300. The FFT operation unit 200 and the thickness determination unit 300 will later be described in detail with reference to FIG. 7.

In order to measure wavelength distribution characteristics (e.g., an amplitude ratio ($\Psi$) or a phase difference ($\Delta$)) of the reflected light 106 from the object 110, the light source 102 may irradiate light having a desired (or alternatively, predetermined) wavelength range in a desired (or alternatively, predetermined) angle. The light detector 108 may detect electric signals of various wavelength components included in the reflected light 106 from the object 110 and generate a wavelength domain spectrum demonstrating the wavelength distribution characteristics (e.g., an amplitude ratio ($\Psi$) or a phase difference ($\Delta$)) of the reflected light 106. The wavelength domain spectrum may be generated by a separate processor (not shown), instead of the light detector 108.

As shown in FIG. 2, the optical thickness measurement apparatus 100 according to some example embodiments of the present inventive concepts may further include a polarizer 112 provided between the light source 102 and the object 110. The light generated from the light source 102 may be linearly polarized by the polarizer 112. Further, the optical thickness measurement apparatus 100 according to some example embodiments of the present inventive concepts may further include an analyzer 118 provided between the object 110 and the light detector 108. The analyzer 118 may analyze a change in the polarization of the reflected light 106. Meanwhile, according to some example embodiments of the present inventive concepts, the optical thickness measurement apparatus 100 may further include, for example, a compensator or a phase-modulator (not shown).

The optical thickness measurement apparatus 100 according to an example embodiment of the present inventive concepts may be a non-contact, non-destructive apparatus capable of evaluating an object to be measured without processing, destructing, or converting the object. The optical thickness measurement apparatus 100 according to an example embodiment of the present inventive concepts may include, for example, a spectroscopic ellipsometer (SE). Compared to a single-wavelength ellipsometer using a light source of a single wavelength, the spectroscopic ellipsometer (SE) is capable of accurately measuring various characteristics of an object using a wide band light source including lights of various wavelengths.

Figure 3:
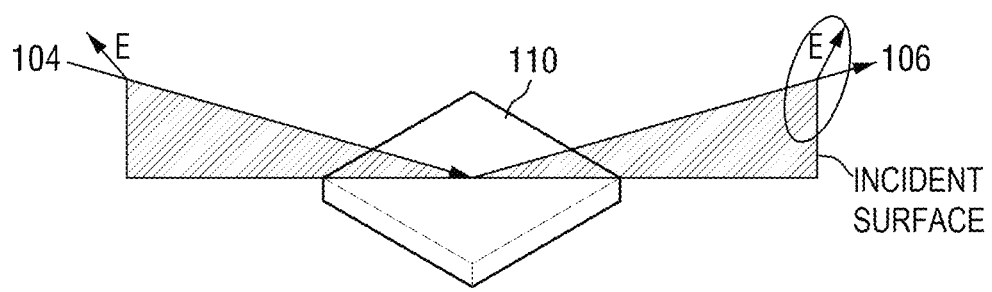
FIG. 3 illustrates a conceptual diagram illustrating how to measure the thickness of an object using the optical thickness measurement apparatus shown in FIG. 1.

FIG. 3 illustrates a conceptual diagram illustrating how to measure the thickness of an object 110 using the optical thickness measurement apparatus 100 shown in FIG. 1.

Referring to FIG. 3, the light source 102 may irradiate incident light 104 into the object 110. The optical thickness measurement apparatus 100 may acquire the wavelength domain spectrum of the reflected light 106 from a surface of the object 110 using differences in the refractive indexes depending on the wavelengths of light. In detail, the optical thickness measurement apparatus 100 may acquire the spectrum corresponding to, for example, the amplitude ratio ($\Psi$) or the phase difference ($\Delta$) using complex refraction so as to detect a fine structure (e.g., nano-sized contact holes, trenches or line/space with high resolution) from the surface of the object 110. Polarized states of the incident light 104 may be divided into s polarized component and p polarized component. The s polarized component is a component vibrating perpendicular to the incident surface, and the p polarized component is a component vibrating parallel to the incident surface. The s and p polarized components of the reflected light 106 from the surface of the object 110 may have a change in, for example, amplitude or phase, and the optical thickness measurement apparatus 100 may measure the change as a complex reflectance ratio (ρ). For example, the optical thickness measurement apparatus 100 according to an example embodiment of the present inventive concepts measures changed polarized states of the reflected light 106, as represented by Equation (1):

$$\rho = \frac{r_p}{r_s} = \tan(\psi) e^{i\Delta} \quad (1)$$

where rp denotes a reflection factor for the p polarized component, rs denotes a reflection factor for the s polarized component, Ψ denotes an amplitude ratio (Ψ) of the reflected light 106, and Δ denotes a phase difference of the reflected light 106.

The data of the amplitude ratio (Ψ) or the phase difference (Δ) of the reflected light 106, which can be measured by the optical thickness measurement apparatus 100, is not a value of the thickness or optical constant of the object 110. The data of the amplitude ratio (Ψ) or the phase difference (Δ) of the reflected light 106 may not be directly converted into a value of the thickness or optical constant of the object 110, either. Therefore, the data of the amplitude ratio (Ψ) or the phase difference (Δ) of the reflected light 106, which can be measured by the optical thickness measurement apparatus 100, may be analyzed and/or processed to obtain the value of the thickness or optical constant of the object 110.

Figure 4:
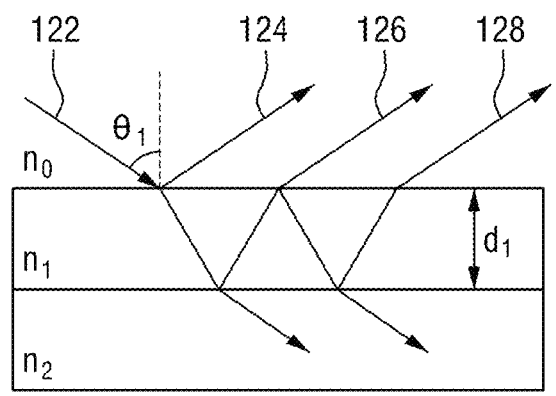
FIG. 4 illustrates reflected light for measuring a thickness of an object according to an example embodiment of the present inventive concepts.
Figure 7:
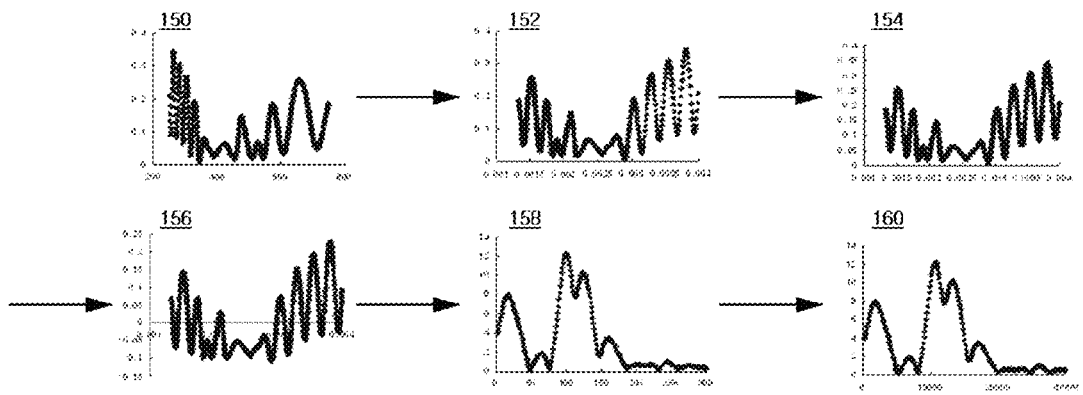
FIG. 7 illustrates processing steps of the method for measuring a thickness of an object according to an example embodiment of the present inventive concepts.

FIG. 4 illustrates reflected light for measuring a thickness of an object according to an example embodiment of the present inventive concepts, and FIG. 7 illustrates processing steps of a method for measuring a thickness of an object according to an example embodiment of the present inventive concepts.

FIG. 4 illustrates reflected light used in measuring a thickness of the object 110 using the optical thickness measurement apparatus 100 shown in FIG. 1.

Referring to FIG. 4, in the relationship between incident light 122 and refracted light established when the light is refracted at a boundary between isotropic, non-conductive media having different indexes, a phase angle (β) of reflected light 124, 126, 128 may be expressed by Equation (2):

$$\beta = 2\pi \left(\frac{d}{\lambda}\right) n \cos\theta \quad (2)$$

In detail, the Equation (2) may be derived by generally known Snell's law and a Fresnel equation. Here, λ denotes a wavelength of the incident light 122, d denotes a distance from a surface of an object to an interior interfacial surface between layers having different refractive indexes, n denotes a refractive index of a medium, and θ denotes an incident angle of the incident light with respect to an axis perpendicular to a surface of an object to be measured. In FIG. 4, refractive indexes of various layers are denoted by n0, n1 and n2. Light reflection occurs at an interfacial surface between layers having different refractive indexes, and amplitude reflection factors (e.g., Fresnel coefficients) of p and s polarized components on the interfacial surface between a layer 0 and a layer 1 having different refractive indexes are given by Equation (3):

$$r_s = \left(\frac{E_{0r}}{E_{0i}}\right)_s = \frac{n_i \cos\theta_i - n_t \cos\theta_t}{n_i \cos\theta_i + n_t \cos\theta_t} \quad (3)$$

$$r_p = \left(\frac{E_{0r}}{E_{0i}}\right)_p = \frac{n_t \cos\theta_i - n_i \cos\theta_t}{n_t \cos\theta_i + n_i \cos\theta_t}$$

As shown in FIG. 4, the reflected light given by the above Equation reciprocates within a layer having a thickness d1 multiple times. Accordingly, the light directly reflected from an interfacial surface between the layer and its adjacent layer and the light reflected in the layer multiple times may have different optical path lengths and different phases, thereby causing optical interference at the surface of the object 110. The optical interference is expressed using a phase angle (β) of the light within the layer 1 by Equation (4):

$$\beta = 2\pi \left(\frac{d_1}{\lambda}\right) n_1 \cos\theta_1 \quad (4)$$

The measurement result of the optical thickness measurement apparatus 100 may be given as data of the amplitude ratio (Ψ) or the phase difference (Δ) of the reflected light 106 from the surface of the object 110. The amplitude ratio (Ψ) or the phase difference (Δ) of the reflected light 106 from the surface of the object 110 can be expressed by Equation (5):

$$\psi(\lambda), \Delta(\lambda) = ftn.(\beta) \quad (5)$$

For example, the amplitude ratio (Ψ) or the phase difference (Δ) of the reflected light 106 from the surface of the object 110, as measured by the optical thickness measurement apparatus 100, is a function of the phase angle (β) represented by the thickness (d) and 1/wavelength. Further, a signal for the amplitude ratio (Ψ) or the phase difference (Δ) of the reflected light 106 from the surface of the object 110, which is measured by the optical thickness measurement apparatus 100, can be obtained as a wavelength domain signal. Therefore, to obtain a thickness (d) domain signal, fast fourier transform (FFT) on the wavelength domain signal may be performed. In such a manner, the thickness d of the object 110 (e.g., a thickness of a film material or a pattern on a substrate) can be measured.

Figure 5:
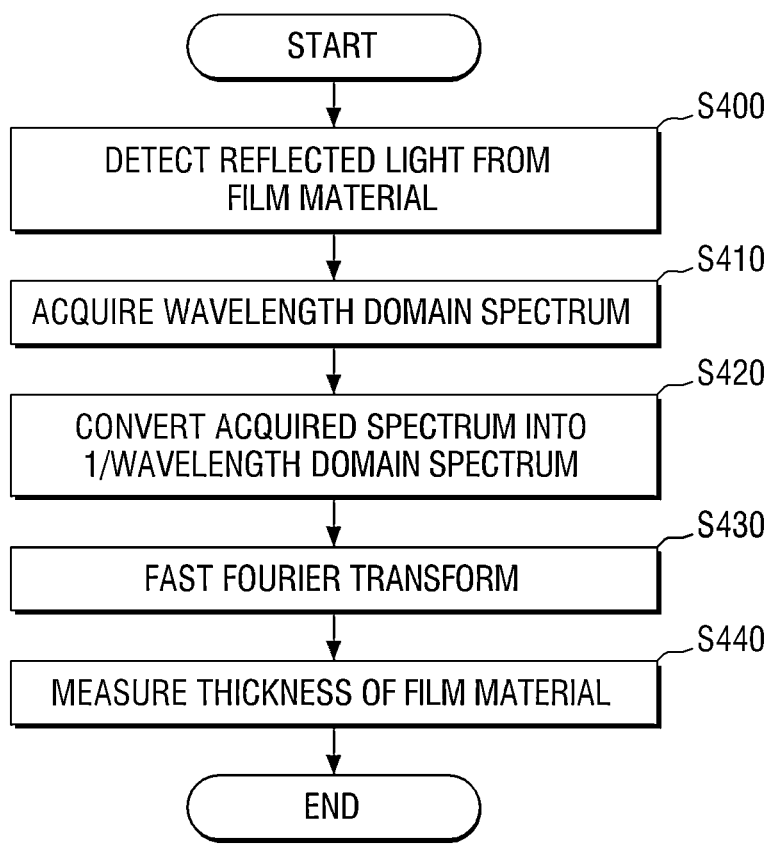
FIG. 5 is a flowchart illustrating a method for measuring a thickness of an object according to an example embodiment of the present inventive concepts.

FIG. 5 is a flowchart illustrating a method for measuring a thickness of an object according to an example embodiment of the present inventive concepts. FIG. 7 illustrates processing steps of the method for measuring a thickness of an object according to an example embodiment of the present inventive concepts.

Referring to FIGS. 5 and 7, the method for measuring a thickness of an object (e.g., a thickness of an existing or remaining film material either before or after performing a semiconductor manufacturing process (e.g., a deposition or an etching of a film material on a substrate)) according to an example embodiment of the present inventive concepts may include detecting, for example, by measuring, reflected light 106 from an object 110 (S400), acquiring a wavelength domain spectrum 150 for an amplitude ratio (Ψ) or a phase difference (Δ) (S410), converting a wavelength domain spectrum 150 into a 1/wavelength domain spectrum 152 (S420), acquiring a resulting spectrum 158 by performing FFT on the 1/wavelength domain spectrum 152 (S430) and determining the thickness of the object 110 from the resulting spectrum 158 (S440).

In detail, the optical thickness measurement apparatus 100 according to an example embodiment of the present inventive concepts acquires the wavelength domain spectrum 150 for the amplitude ratio (Ψ) or the phase difference (Δ) of the reflected light 106 from the surface of the object 110 by irradiating incident light 104. Next, the FFT operation unit 200 converts the wavelength domain spectrum for the amplitude ratio (Ψ) or the phase difference (Δ) of the reflected light 106, as acquired by the optical thickness measurement apparatus 100, into the 1/wavelength domain spectrum 152, and acquires the resulting spectrum 158 by performing FFT on the converted 1/wavelength domain spectrum. According to some example embodiments of the present inventive concepts, an algorithm used for the FFT may include, for example, a Cooley-Tukey algorithm or a prime factor algorithm. The acquired resulting spectrum 158 is a thickness domain spectrum, and the thickness determination unit 300 may measure the thickness of the object 110 (e.g., a thickness of a film material or a pattern on a substrate) by analyzing the resulting spectrum 158.

According to some example embodiments of the present inventive concepts, measuring the thickness of the object 110 by analyzing the resulting spectrum 158 may include, for example, determining a thickness value at a peak of the resulting spectrum 158 as the thickness of the object 110. For example, because the resulting spectrum 158 is a thickness domain spectrum, the thickness of the object 110 may be determined by searching for the highest peak and finding a thickness corresponding to the highest peak. According to some example embodiments of the present inventive concepts, measuring the thickness of the object 110 by analyzing the resulting spectrum 158 may further include calibrating the determined thickness value using a pre-measured (or alternatively, desired) reference value. For example, the thickness value obtained from the resulting spectrum 158 may be scaled with respect to the pre-measured (or alternatively, desired) reference value. According to some example embodiments of the present inventive concepts, measuring the thickness of the object 110 by analyzing the resulting spectrum 158 may further include calibrating the determined thickness value using an optical constant value of the object 110.

The measured thickness of the remaining object 110 (e.g., a film material or a pattern remaining on a substrate) may be compared with respect to a desired defect tolerance range or the initial thickness of the object before performing a semiconductor manufacturing process thereon, thereby determining whether a semiconductor substrate, for example, is defective or not. If the measured thickness value of the remaining object 110 is within the desired defect tolerance range or is comparatively negligible compared with the initial thickness of the object 110, it may be determined that the subject semiconductor manufacturing process was successfully performed. By contrast, if the measured thickness value of the remaining object 110 exceeds the desired defect tolerance range or it is determined that a substantial portion of the initial thickness of the object remains, then this comparison result is fed back to the semiconductor manufacturing process so that the semiconductor manufacturing process continue until the measured thickness value of the remaining object 110 falls within the desired defect tolerance range or becomes comparatively negligible compared with the initial thickness.

Figure 6:
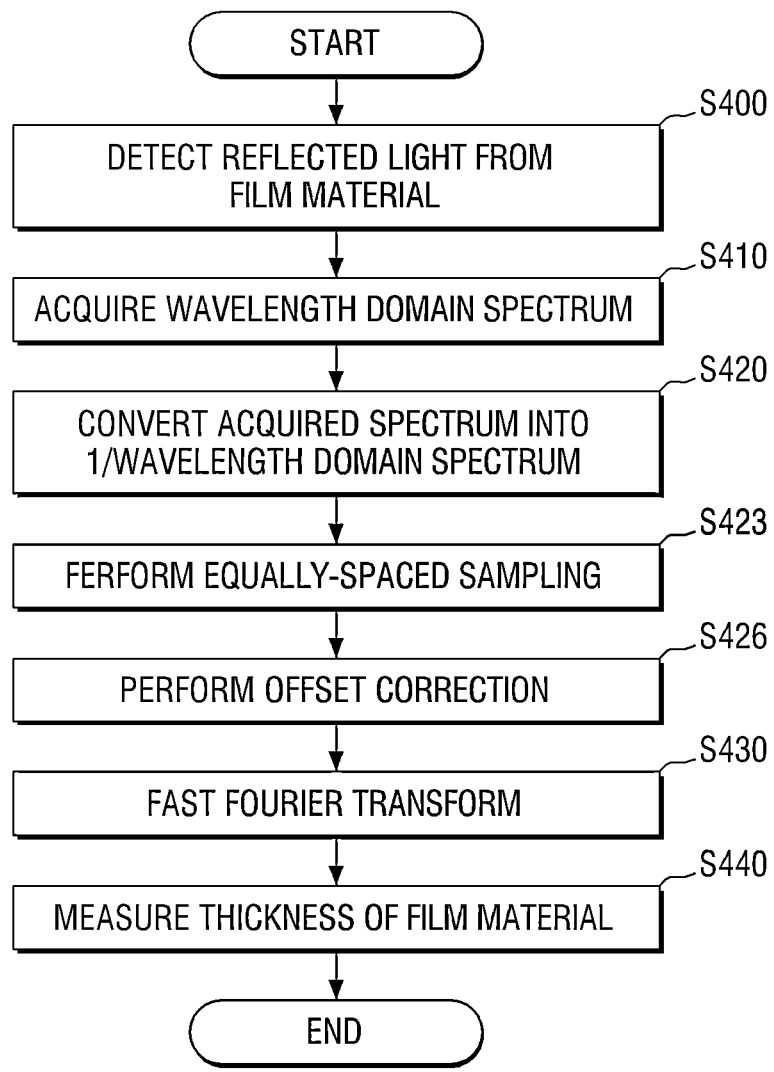
FIG. 6 is a flowchart illustrating a method for measuring a thickness of an object according to another example embodiment of the present inventive concepts.

FIG. 6 is a flowchart illustrating a method for measuring a thickness of an object to be measured according to another example embodiment of the present inventive concepts.

Referring to FIG. 6, the method for measuring a thickness of an object according to another example embodiment of the present inventive concepts may include detecting, for example, by measuring, reflected light 106 from an object 110 (S400), acquiring a wavelength domain spectrum 150 for an amplitude ratio (Ψ) or a phase difference (Δ) (S410), converting a wavelength domain spectrum 150 into a 1/wavelength domain spectrum 152 (S420), performing equally-spaced sampling on the 1/wavelength domain spectrum 152 (S423), performing offset compensation on the 1/wavelength domain spectrum 152 (S426), acquiring a resulting spectrum 158 by performing FFT on the 1/wavelength domain spectrum 152 (S430) and measuring the thickness of the object 110 from the resulting spectrum 158 (S440).

Referring to FIGS. 6 and 7, according to some example embodiments of the present inventive concepts, the acquiring of the resulting spectrum 158 by performing FFT on the 1/wavelength domain spectrum 152 may further include acquiring an equally-spaced sampled spectrum 154 by performing equally-spaced sampling on the 1/wavelength domain spectrum 152. Because the spectral data are discrete values, the data converted from the 1/wavelength domain spectrum 152 for the amplitude ratio (Ψ) or the phase difference (Δ) of the reflected light 106 may be non-uniformly distributed in a 1/wavelength domain (e.g., along a horizontal axis). The non-uniformly distributed data may be compensated for at equal intervals, thereby determining the thickness of the object 110 more accurately and easily.

According to some example embodiments of the present inventive concepts, the acquiring of the resulting spectrum 158 by performing FFT on the 1/wavelength domain spectrum 152 may further include acquiring an offset compensated spectrum 156 by performing offset compensation on the 1/wavelength domain spectrum. A baseline of a measured signal derived in the course of measuring the signal using the optical thickness measurement apparatus 100 may be removed, thereby measuring the thickness of the object 110 more accurately and easily.

Various embodiments of the FFT operation unit 200 for processing the wavelength domain spectrum and the thickness determination unit 300 for determining the thickness of an object may be implemented in a recording medium readable by, for example, a computer using, example, e.g., software, hardware, or a combination thereof. According to some example embodiments of the present inventive concepts, the data of the amplitude ratio (Ψ) or the phase difference (Δ) of the reflected light 106 from the surface of the object 110, as measured by the optical thickness measurement apparatus 100, may be transferred as input data to the software or hardware.

Using hardware, the example embodiments described herein may be implemented using, for example, application specific integrated circuits (ASICs), digital signal processors (DSPs), DSPDs (digital signal processing devices), programmable logic devices (PLDs), field programmable gate arrays (FPGAs), processors, controllers, micro-controllers, microprocessors, electric units for performing various functions, or a combination thereof.

Using software, the example embodiments described herein may be implemented using separate software modules for performing at least one function or operation. Software codes may be implemented by using a software application expressed in an appropriate program language.

Figure 8:
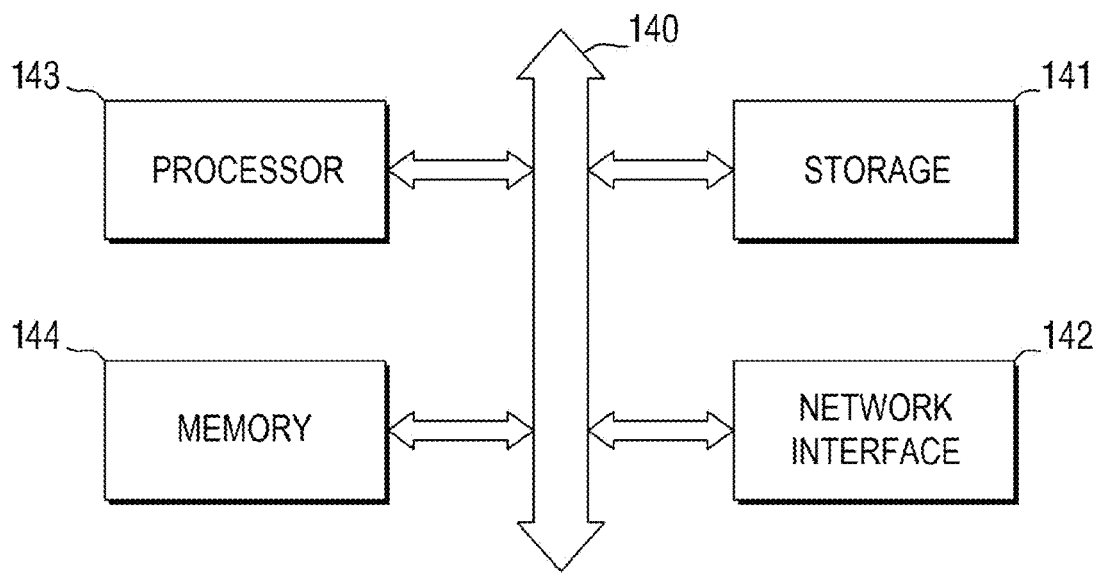
FIG. 8 is a block diagram of an optical thickness measurement apparatus according to an example embodiment of the present inventive concepts.

FIG. 8 is a block diagram of an optical thickness measurement apparatus according to an example embodiment of the present inventive concepts. The optical thickness measurement apparatus may have the same configuration as shown in FIG. 1. The optical thickness measurement apparatus may include a processor 143 executing codes, a storage 141, a network interface 142, a memory 144, and a data bus 140, which is connected to the storage 141, the network interface 142, the processor 143 and the memory 144 to function as a data movement path for transmitting/receiving data to/from an external device. Software codes may be stored in the memory 144 and executed by the processor 143. The data of the amplitude ratio (Ψ) or the phase difference (Δ) of the reflected light 106 from the surface of the object 110 measured by the optical thickness measurement apparatus 100 may be stored in the storage 141.

Figure 9:
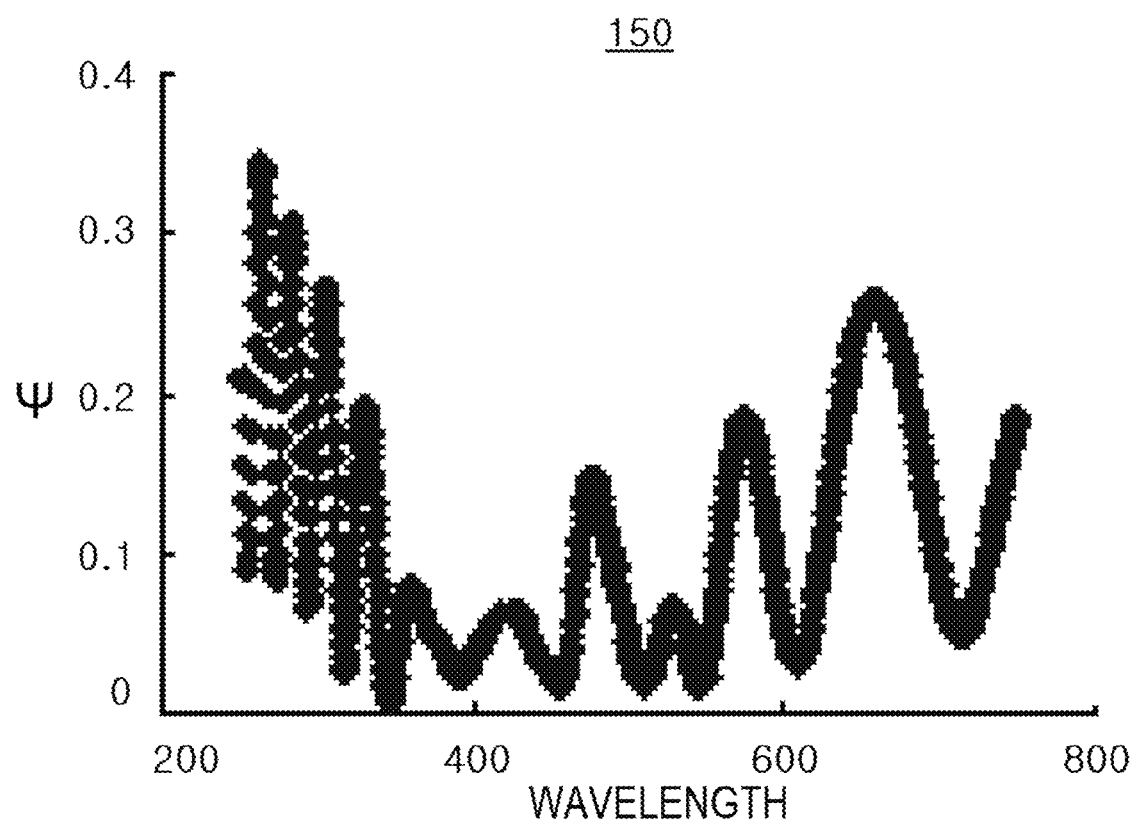
FIG. 9 is an enlarged view of the wavelength domain spectrum shown in FIG. 7.

FIG. 9 is an enlarged view of the wavelength domain spectrum 150 shown in FIG. 7.

Referring to FIG. 9, the wavelength domain spectrum 150 is a spectrum showing the amplitude ratio (Ψ) or the phase difference (Δ) of the reflected light 106 from the surface of the object 110 after the optical thickness measurement apparatus 100 irradiates the incident light 104 having a desired (or alternatively, predetermined) wavelength range into the object 110. The light detector 108 of the optical thickness measurement apparatus 100 detects an electric signal of each wavelength component included in the reflected light 106 from the object 110 to acquire the wavelength domain spectrum showing wavelength distribution characteristics including the amplitude ratio (Ψ) or the phase difference (Δ) of the reflected light 106. In FIG. 9, the horizontal axis indicates the wavelength of the reflected light 106 and the vertical axis indicates the amplitude ratio (Ψ) or the phase difference (Δ) of the reflected light 106. Both the spectrum of the amplitude ratio (Ψ) and the spectrum of the phase difference (Δ) can be obtained by the optical thickness measurement apparatus 100. In some example embodiments of the present inventive concepts, in order to measure the thickness of the object 110, the spectrum of the amplitude ratio (Ψ) may be selected as an initial signal. In other example embodiments of the present inventive concepts, in order to measure the thickness of the object 110, the spectrum of the phase difference (Δ) may be selected as an initial signal.

Figure 10:
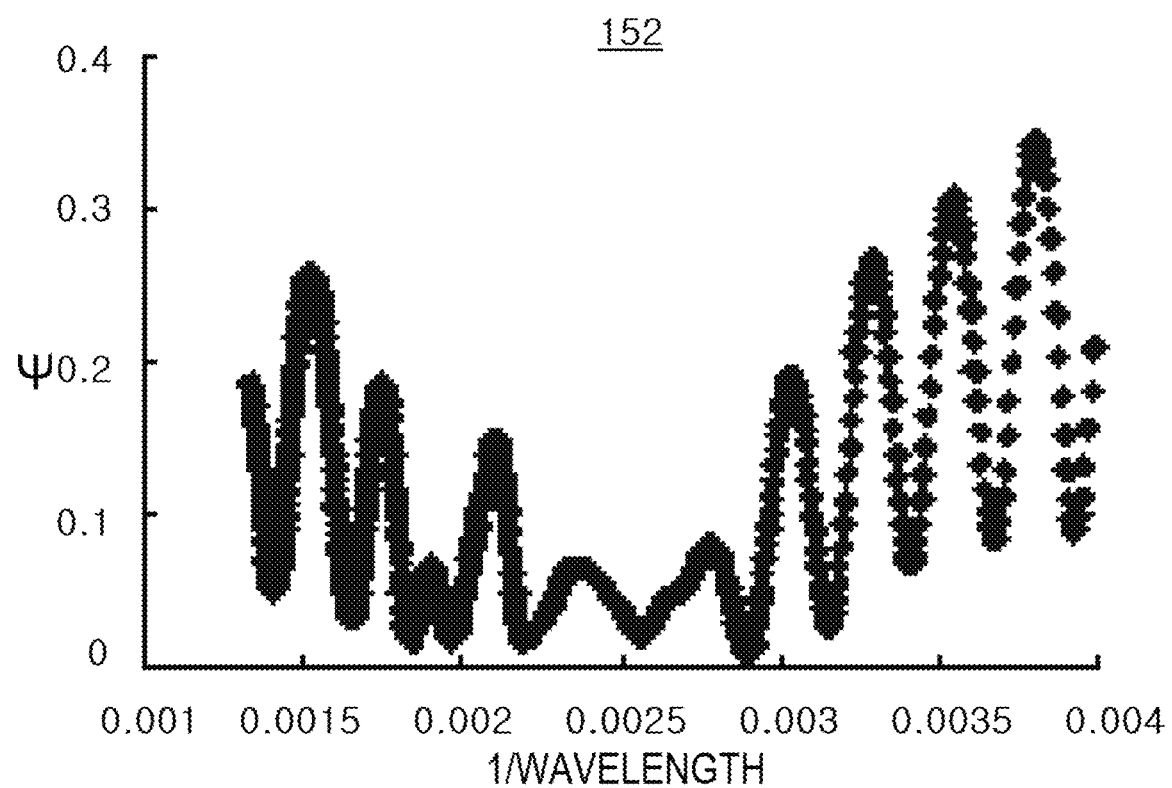
FIG. 10 is an enlarged view of the 1/wavelength domain spectrum shown in FIG. 7.

FIG. 10 is an enlarged view of the 1/wavelength domain spectrum 152 shown in FIG. 7.

Referring to FIG. 10, the 1/wavelength domain spectrum 152 is a spectrum obtained by converting the domain of the wavelength domain spectrum 150 of the amplitude ratio (Ψ) or the phase difference (Δ) of the reflected light 106 acquired from the optical thickness measurement apparatus 100 into a 1/wavelength domain. In FIG. 10, the horizontal axis indicates the domain converted into 1/wavelength and the vertical axis indicates the amplitude ratio (Ψ) (or alternatively, the phase difference (Δ)) of the reflected light 106. In some example embodiments of the present inventive concepts, data may be non-uniformly distributed when the domain of the wavelength domain spectrum 150 shown in FIG. 9 is converted into the 1/wavelength domain. Because data of the spectrum are discretely distributed values, the data converted from the 1/wavelength domain spectrum 152 for the amplitude ratio (Ψ) or the phase difference (Δ) of the reflected light 106 may be non-uniformly distributed, for example, in a range of between 0.0032 and 0.004, in a direction of the 1/wavelength domain (i.e., the horizontal axis) direction.

Figure 11:
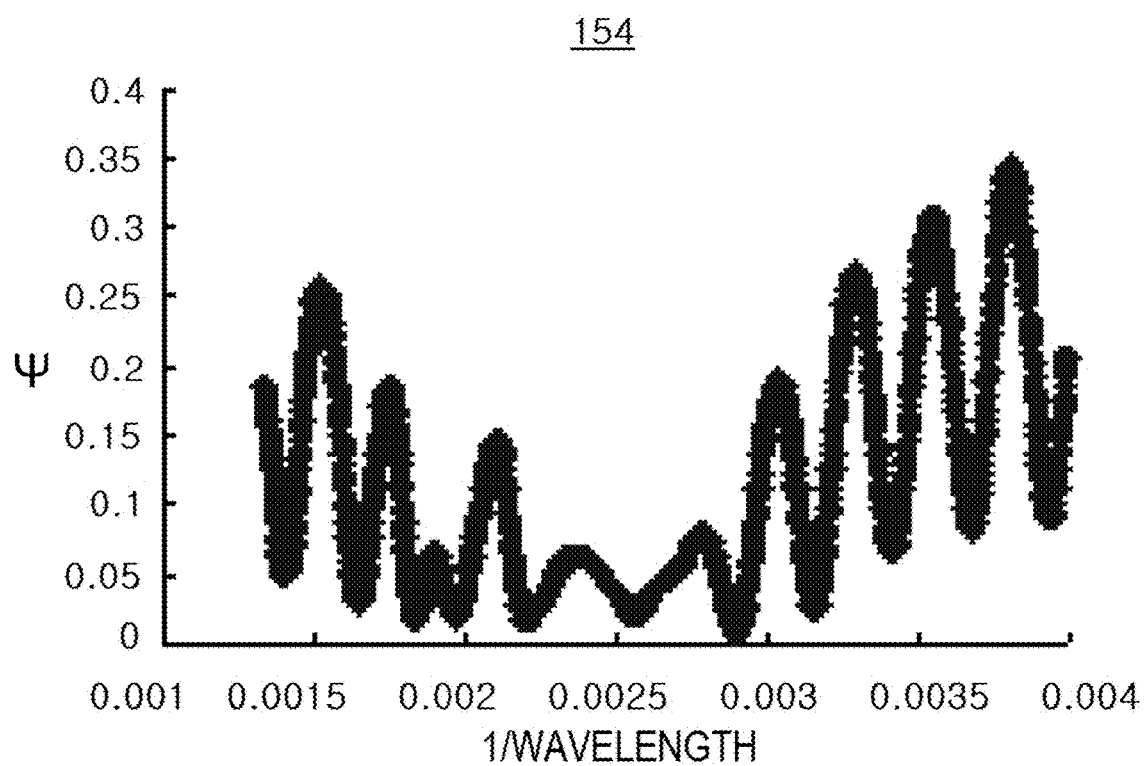
FIG. 11 is an enlarged view of the equally-spaced sampled spectrum shown in FIG. 7.

FIG. 11 is an enlarged view of the equally-spaced sampled spectrum 154 shown in FIG. 7.

Referring to FIG. 11, the equally-spaced sampled spectrum 154 is a spectrum obtained by sampling the 1/wavelength domain spectrum 152 at equal intervals and compensating the same. The non-uniformly distributed data can be addressed by performing the equally-spaced sampling. As confirmed from FIGS. 10 and 11, the data in the range of between 0.0032 and 0.004 is compensated for in the direction of the 1/wavelength domain (i.e., the horizontal axis) direction. The non-uniformly distributed data is compensated for at equal intervals, thereby determining the thickness of the object 110 more accurately and easily.

Figure 12:
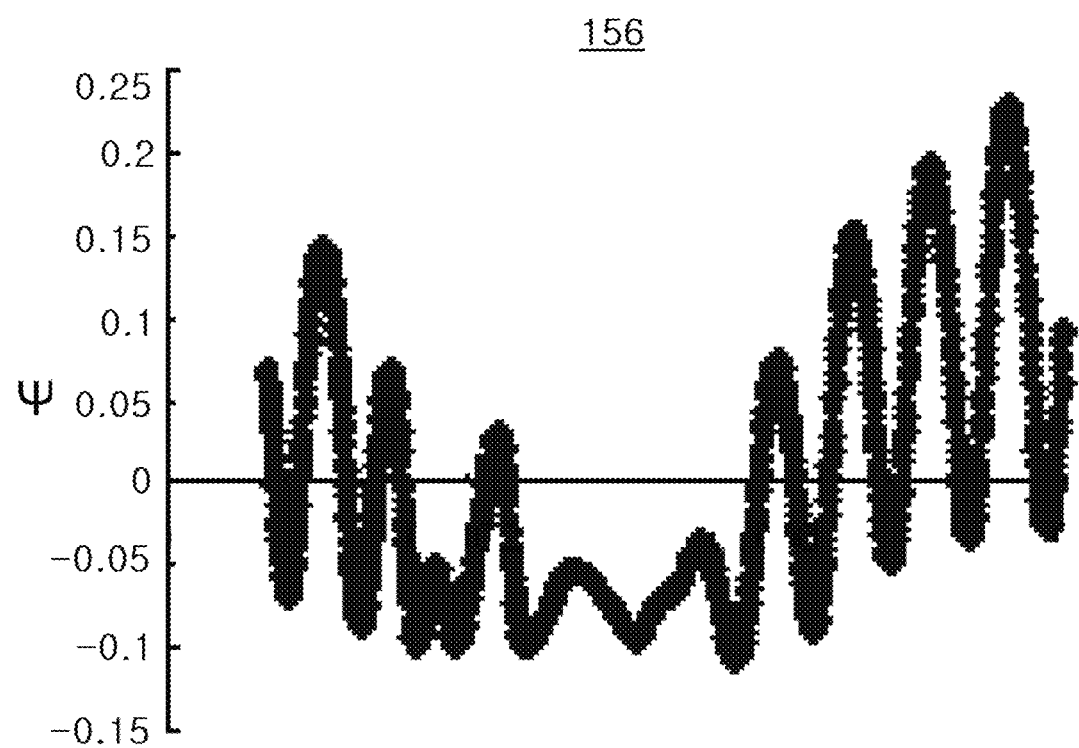
FIG. 12 is an enlarged view of the offset compensated spectrum shown in FIG. 7.

FIG. 12 is an enlarged view of the offset compensated spectrum 156 shown in FIG. 7.

Referring to FIG. 12, the offset compensated spectrum 156 is a spectrum obtained by offset-compensating for the 1/wavelength domain spectrum. In order to measure the thickness of the object 110 more accurately and easily, a baseline of a measured signal derived in the course of measuring the signal using the optical thickness measurement apparatus 100 may be removed.

Figure 13:
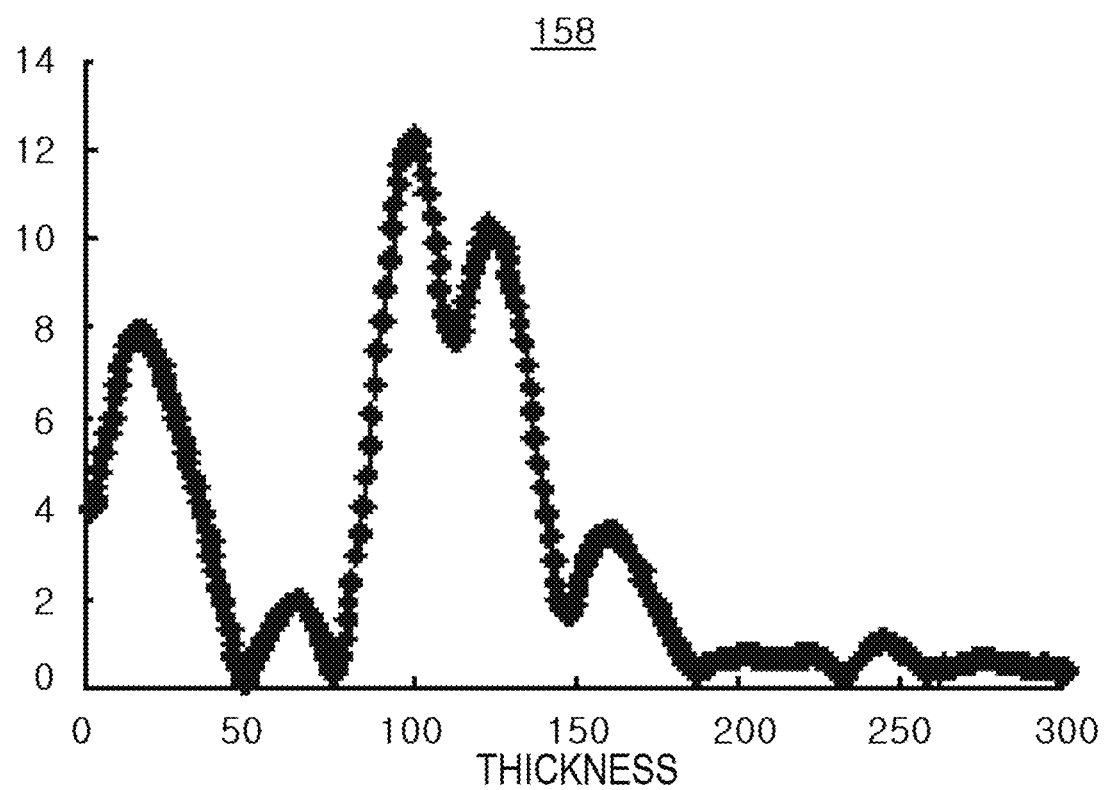
FIG. 13 is an enlarged view of the resulting spectrum shown in FIG. 7.

FIG. 13 is an enlarged view of the resulting spectrum 158 shown in FIG. 7.

Referring to FIG. 13, the resulting spectrum 158 is a spectrum obtained by performing FFT on the converted 1/wavelength domain spectrum. According to some example embodiments of the present inventive concepts, an algorithm used in the FFT may include a Cooley-Tukey algorithm or a prime factor algorithm. The obtained resulting spectrum 158 is a thickness domain spectrum, which may be analyzed by the thickness determination unit 300 to determine the thickness of object 110 (e.g., a film material or a pattern on a substrate). The horizontal axis of the spectrum shown in FIG. 13 is a thickness domain obtained by converting the 1/wavelength domain. A thickness value positioned at a peak of the resulting spectrum 158 may be determined as the thickness of the object. For example, a horizontal axis value corresponding to the peak of the spectrum shown in FIG. 13 is '100', and this value may be determined as the thickness of the object 110 (e.g., a film material or a pattern on a substrate).

FIG. 14 is an enlarged view of the calibrated spectrum 160 shown in FIG. 7.

Referring to FIG. 14, the calibrated spectrum 160 is a spectrum obtained by performing unit scaling on the resulting spectrum 158 in the thickness domain. According to some example embodiments of the present inventive concepts, the thickness domain resulting spectrum 158 may calibrate the determined thickness value using a pre-measured (or alternatively, desired) reference value. For example, the thickness may be unit-scaled by calibrating the value obtained from the resulting spectrum 158 with respect to the pre-measured reference value. According to other example embodiments of the present inventive concepts, the thickness domain resulting spectrum 158 may also calibrate the determined thickness value using an optical constant value of the object 110. For example, a horizontal axis value corresponding to the peak of the calibrated spectrum 160 shown in FIG. 14 is '10000', which is derived by calibrating the determined thickness value '100' of the object 110 at the peak of the resulting spectrum 158 of FIG. 13.

The measured thickness of the remaining object 110 (e.g., a film material or a pattern remaining one a substrate) may be used in determining, for example, whether a semiconductor substrate is defective or not. For example, whether the measured thickness is within a defect tolerance range or is comparatively negligible with respect to the initial thickness of the object before performing a semiconductor manufacturing process thereon may be used in determining, for example, whether a semiconductor substrate is defective or not. If the measured thickness value of the remaining object 110 is within the desired defect tolerance range or is comparatively negligible compared with the initial thickness of the object 110, it may be determined that the subject semiconductor manufacturing process was successfully performed. By contrast, if the measured thickness value of the remaining object 110 exceeds the desired defect tolerance range or it is determined that a substantial portion of the initial thickness of the object remains, then this comparison result is fed back to the semiconductor manufacturing process so that the semiconductor manufacturing process continue until the measured thickness value of the remaining object 110 falls within the desired defect tolerance range or becomes comparatively negligible compared with the initial thickness.

According to the present inventive concepts, the thickness of a pattern having a complicated structure can be measured using the optical thickness measurement apparatus 100, for example, a spectroscopic ellipsometer (SE), widely used in manufacturing sites where semiconductor processes are actually performed. Because only spectrum analyses are used in the course of measuring the thickness of the object (e.g., a film material or a pattern) without using a mathematical modeling technique, for example, parameter fitting, the thickness of the object having a complicated structure can be relatively rapidly measured with high accuracy.

A separate algorithm based on mathematical modeling, for example, parameter fitting, has conventionally been used to analyze the data of the amplitude ratio ($\Psi$) or the phase difference ($\Delta$) of the reflected light 106. Analyzing a polarized state of the reflected light 106 using the conventional technique may be suitable for a pattern having a simple structure. However, in a case where the semiconductor substrate has a complicated pattern, for example, a cell region (compared with a test region), it is challenging to obtain data of the pattern using the conventional algorithm because the conventional algorithm for example, sustains a tremendous amount of computation load and an excessive increase of computation time.

By contrast, according to the present inventive concepts, in order to efficiently analyze the data of the amplitude ratio ($\Psi$) or the phase difference ($\Delta$) of the reflected light 106, use of the mathematical modeling, for example, parameter fitting, is minimized, and thus the thickness of a complicated pattern can be relatively rapidly obtained.

While the present inventive concepts has been particularly shown and described with reference to example embodiments thereof, it will be understood by those of ordinary skill in the art that various changes in form and details may be made therein without departing from the spirit and scope of the present inventive concepts as defined by the following claims. It is therefore desired that the present example embodiments be considered in all respects as illustrative and not restrictive, reference being made to the appended claims rather than the foregoing description to indicate the scope of the inventive concepts.

What is claimed is:

1. A method for measuring a thickness of an object, the method comprising:
   acquiring a wavelength domain spectrum for at least one of an amplitude ratio ($\Psi$) and a phase difference ($\Delta$) of reflected light from a film material;
   converting the wavelength domain spectrum into a 1/wavelength domain spectrum;
   acquiring a resulting spectrum by performing fast fourier transform (FFT) on the 1/wavelength domain spectrum; and
   measuring a thickness of the film material from the resulting spectrum.

2. The method of claim 1, wherein the at least one of the amplitude ratio ($\Psi$) and the phase difference ($\Delta$) of the reflected light is measured using a spectroscopic ellipsometer.

3. The method of claim 1, wherein the film material includes two or more layers.

4. The method of claim 1, wherein the film material includes two or more materials.

5. The method of claim 1, further comprising:
   performing equally-spaced sampling on the 1/wavelength domain spectrum.

6. The method of claim 5, further comprising:
   performing offset compensation on the 1/wavelength domain spectrum.

7. The method of claim 1, wherein the measuring a thickness of the film material from the resulting spectrum comprises determining a thickness value at a peak of the resulting spectrum as the thickness of the film material.

8. The method of claim 7, wherein the measuring a thickness of the film material from the resulting spectrum further comprises calibrating the determined thickness value using a reference value.

9. The method of claim 7, wherein the measuring a thickness of the film material from the resulting spectrum further comprises calibrating the determined thickness value using an optical constant value of the film material.

10. The method of claim 1, wherein an algorithm used in the FFT includes one of a Cooley-Tukey algorithm and a prime factor algorithm.

11. A method for determining a defectiveness of a substrate, the method comprising:
   acquiring a wavelength domain spectrum for at least one of an amplitude ratio ($\Psi$) and a phase difference ($\Delta$) of reflected light from a substrate having a pattern formed thereon;
   converting the wavelength domain spectrum into a 1/wavelength domain spectrum;
   acquiring a resulting spectrum by performing fast fourier transform (FFT) on the 1/wavelength domain spectrum; and
   measuring a thickness of the pattern formed on the substrate from the resulting spectrum.

12. The method of claim 11, further comprising:
   determining whether the substrate is defective by comparing the measured thickness of the pattern with respect to a defect tolerance range.

13. The method of claim 11, wherein at least one of the amplitude ratio ($\Psi$) or the phase difference ($\Delta$) of the reflected light is measured using a spectroscopic ellipsometer.

14. The method of claim 11, wherein the pattern includes two or more layers.

15. The method of claim 11, wherein the measuring a thickness of the pattern from the resulting spectrum comprises determining a thickness value at a peak of the resulting spectrum as the thickness of the pattern.

16. A method for determining a defectiveness of a substrate, the method comprising:
   irradiating light onto the object;
   detecting light reflected from a remaining object on the substrate;
   acquiring a wavelength domain spectrum based on one of an amplitude ratio ($\Psi$) and a phase difference ($\Delta$) of the detected reflected light;
   converting the wavelength domain spectrum into a 1/wavelength domain spectrum;

acquiring a resulting spectrum by performing fast fourier transform (FFT) on the 1/wavelength domain spectrum; and determining a thickness of the object from the resulting spectrum.

17. The method of claim 16, further comprising:

determining whether the substrate is defective by comparing the measured thickness of the object with respect to a defect tolerance range.

18. The method of claim 16, further comprising at least one of:

performing equally-spaced sampling on the 1/wavelength domain spectrum; and performing offset compensation on the 1/wavelength domain spectrum.

19. The method of claim 16, wherein the determining a thickness of the object from the resulting spectrum comprises determining a thickness value at a peak of the resulting spectrum as the thickness of the object.

20. The method of claim 16, further comprising at least one of:

calibrating the determined thickness value using a reference value; and calibrating the determined thickness value using an optical constant value of the object.

\* \* \* \* \*